(12) United States Patent
Nebel (10) Patent No.: US 8,496,300 B2
(45) Date of Patent: Jul. 30, 2013

(54) WHEEL RIM GUARD

(76) Inventor: Michael W. Nebel, Smith Center, KS (US)

(*) Notice: Subject to any disclaimer, the term of this patent is extended or adjusted under 35 U.S.C. 154(b) by 303 days.

(21) Appl. No.: 12/861,335

(22) Filed: Aug. 23, 2010

(65) Prior Publication Data

US 2012/0043804 A1 Feb. 23, 2012

(51) Int. Cl.
*B60B 7/00* (2006.01)

(52) U.S. Cl.
USPC .............................. 301/37.104; 301/37.103

(58) Field of Classification Search
USPC ............ 301/37.103–37.104; 40/587; 118/504
See application file for complete search history.

(56) References Cited

U.S. PATENT DOCUMENTS

| | | |
|---|---|---|
| 1,481,363 A | 1/1923 | Hall |
| 2,503,988 A | 4/1950 | Arbib |
| 2,627,839 A | 2/1953 | Hudgins et al. |
| 2,660,823 A | 12/1953 | Dubin et al. |
| 4,792,191 A | 12/1988 | Farmer |
| 4,955,670 A | 9/1990 | Koller |
| D438,835 S | 3/2001 | Maschino |
| 6,485,106 B1 | 11/2002 | Hermansen et al. |
| 6,585,329 B2 | 7/2003 | Crump |
| 6,685,276 B2 | 2/2004 | Kenion |
| 6,692,085 B1 | 2/2004 | Threadgill |
| D600,188 S | 9/2009 | Torres Rey |
| 2007/0013226 A1 | 1/2007 | Updegraph |
| 2008/0136247 A1 | 6/2008 | Janty |

*Primary Examiner* — Jason Bellinger
(74) *Attorney, Agent, or Firm* — Erickson, Kernell, Derusseau & Kleypas, LLC

(57) ABSTRACT

A wheel rim guard comprising a resilient circular disc having a gap extending from a central inner opening to a circumferential edge of said disc; said disc is shaped to form a body of frusto-conical or cylindrical shape. The wheel rim guard further includes a guide strap received through the disc. One end of the guide strap is fastened proximate to a first edge of the body, the other end of the guide strap is fastened to the body between the first edge and a second edge. The wheel rim guard further includes a hook assembly having at least one hook and a washer attached by a cord, wherein the hooks are received through the central inner opening of the disc and attached to the wheel rim such that tightening the cord on the fixing member secures the wheel rim guard to the wheel rim.

28 Claims, 7 Drawing Sheets

WHEEL RIM GUARD

BACKGROUND OF THE INVENTION

1. Field of the Invention

This invention relates to a guard for a wheel rim, and in particular to a wheel rim guard adjustable to fit various sized wheel rims.

2. Background & Description of the Related Art

The past several decades have experienced a trend by car owners to enhance the appearance of their vehicles by improving the appearance of the tires and wheels. Accordingly, the marketplace has experienced an increased demand for lightweight composite alloy wheels (typically aluminum and magnesium composites) and chrome-plated wheels as an alternative to conventional steel wheels. In response to this increased demand, a purchaser may now optionally purchase alternatives to steel wheels through several venues including car dealerships for factory installed wheels on new cars or aftermarket wheel retailers for replacement wheels. However, alloy and chrome plated wheels are susceptible to corrosion, staining and scratching and are vulnerable to damage caused by acid rain, brake dust, road salts and tar. As a result, these wheels must be cleaned and maintained on a regular basis. Thus, special chemicals and cleaning agents have been developed for specific types of wheels. However, different types of cleaning materials are used for the tires and tire sidewalls—these cleaning agents, unfortunately, are also a source for potential damage to the wheel rims.

Tire cleaners are commonly formulated specifically to provide bright and clean sidewalls and a glossy appearance of the tire rubber. These cleaners are often highly acidic which, if inadvertently applied to the metal wheel surface, may cause corrosion. In addition, many tire cleaning and maintenance products contain additives such as abrasives, silicone and bleach which have the ability to corrode, stain or scratch the surface of chrome or clear coated or polished aluminum wheels.

Tire cleaning and maintenance products are also potentially harmful to the internal portions of the wheel and brake assembly. Often, alloy and chrome wheels are designed with open spaces between the wheel rim and hub thus exposing the interior of the wheel assembly. Exposing the brake pads and rotors to the acidic cleaning products and/or silicon and other additives may damage the internal components or compromise their operation.

The close proximity of the tire to the wheel greatly increases the chances of exposing the wheel to the harmful tire cleaning and maintenance products. Because of the high risk to the wheel, many tire maintenance product manufacturers have placed labels on their products to instruct users to avoid contact with the wheel rim surface and internals. This, however, is particularly challenging because tire cleaning and maintenance products are often applied with a mist or spray bottle.

Additionally, it is also a problem that wheel cleaners contact the tire surfaces. This causes an inconvenience for a person cleaning the tires and wheels because the wheel cleaner may make the tire more difficult to clean.

Rim covers are known in the prior art to protect the vehicle wheel from harmful tire cleaning products. For example, U.S. Pat. No. 6,485,106 to Hermansen teaches a size adjustable wheel rim mask. The wheel rim mask is a flat, circular disc with a radial gap such that the mask is configurable to and lockable in a plurality of cone-shaped configurations corresponding in size to the wheel rim to be protected. A locking mechanism is provided to lock the mask into a desired configuration. Hermansen discloses that the locking mechanism may be male and female snaps, a tab and recess system, a hook and loop system, adhesive tape, a belt and buckle system, or a ratchet band and clasp system. To use the rim mask, a user must first adjust the mask into the desired position and then place the mask on the rim to be protected. Other systems are known that allow a user to adjust the size of the wheel cover to the size of the wheel to be protected.

The size of wheels or rims may vary greatly and typically varies with the size of the car. Smaller cars typically have rims that are 13 inches in diameter. Larger vehicles may have rims that are up to 26 inches in diameter and beyond. Rear wheel drive vehicles typically need larger diameter rims than front wheel drive vehicles. Many households have multiple cars each having different wheel rim sizes. With the wheel rim covers of the prior art, a user desiring to clean and maintain the tires on multiple cars is required to frequently reconfigure and lock the prior art adjustable wheel rim cover according to the size of each differently sized wheel rim. In addition, prior art wheel rim covers typically lock in one of several selected sizes designed to cover standard sized wheel rims, such as 13 inches or 26 inches as discussed above. However, the actual outer diameter of a wheel rim of a specified size can vary significantly depending on make or manufacturer. Therefore, the preset sizes may not fully cover the wheel rim that is supposed to be of the corresponding size.

Another problem with the wheel rim covers of the prior art is that they do not allow a user open access to the wheel rim.

With the purpose of improving over the shortcomings of the prior art, a wheel rim guard is needed that allows a user to easily cover a wheel rim without needing to adjust and lock the wheel rim cover for every differently sized wheel rim.

SUMMARY OF THE INVENTION

The present invention designed to improve upon the shortcomings of the prior art comprises a system for attaching a wheel rim cover or a cleaning kit to a wheel rim. The wheel rim guard of the present invention fits around the wheel rim and abuts against the tire to shield the wheel rim from tire cleaning agents or dressings. The wheel rim guard, as assembled for use, generally comprises a body having a radial slit, a guide strap and a fastening assembly. The guide strap is formed from a rigid plastic into an arc having a radius somewhat smaller than the radius of the disc. The guide strap is received through an end of the body and the ends of the guide strap are attached thereto.

A user may adjust the effective circumference of the body by adjusting the overlapping relationship of the first and second ends. The diameter of the circumferential edge of the edge may be adjusted by pushing together or pulling apart the disc ends. A user may slide the ends to achieve any desired circumference between the minimum and maximum circumferences as limited by the length of the guide strap.

The fastening assembly generally comprises two hooks, a fastening member and a cord or a drawstring. The cord is threaded through a hole in each hook. Each end of the cord is threaded through a hole of a washer. The ends of the cord are further threaded through the cord receiving hole of the cord lock.

To affix the wheel rim guard or cleaning kit to a wheel rim, the hooks of the fastening assembly are received through a middle opening of the body and hooked to the wheel rim. The circumferential edge of the body is adjusted according to the size of the wheel rim by pulling apart or pushing together the edges of the body. The wheel rim cover is placed on and urged towards the wheel rim to allow the body to expand slightly whereby the circumferential edge engages the sidewalls of the tires. The cord or drawstring is pulled taut whereby the cord lock is pulled tight against the fastening member which abuts against the body to securely fasten the wheel rim guard over the wheel rim.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

It is to be understood that while certain forms of the present invention have been illustrated and described herein, it is not to be limited to the specific forms or arrangement of parts described and shown.

As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Referring to the drawings in more detail, the reference number 1 generally designates a wheel rim guard according to a first embodiment of the present invention. The wheel rim guard 1 of the present embodiment fits over the wheel rim 3 and abuts against the tire 5 to shield the wheel rim 3 from tire cleaning agents or dressings. As used herein the wheel rim 3 and tire 5 may collectively be referred to as the wheel or wheel assembly 6.

The wheel rim guard 1, as assembled for use, generally comprises a frusto-conical body 11 having a radial slit 13, an arcuate adjustment guide or guide strap 15 and a fastening assembly or hook assembly 17. The body 11 is made from a sheet material that bends or flexes about any of the planar axes of the flattened sheet but is generally rigid or incompressible along the planar axes. The sheet material is also preferably resistant to corrosion and degradation potentially resulting from exposure to tire cleaners and dressings. A preferred material of construction is ABS plastic, but it is understood that other materials including paper board or other sheet material providing similar properties could be utilized. The arcuate guide strap or arcuate guide 15 is preferably made from the same or a similar sheet material that bends about any of the planar axes of the flattened sheet material but is generally rigid or incompressible along the planar axes. It is to be understood that the arcuate guide 15 may be formed from a different material than the body 11 and may be of a different thickness.

Unassembled, the body 11 is generally a flat, circular disc having a circular middle opening 19 cut therefrom with the radial slit 13 extending from an inner edge 21 of the middle opening 19 to a circumferential outer edge or peripheral edge 23 of the body 11. Alternatively, the radial slit 13 may be any gap extending from the inner edge 21 of middle opening 19 to the peripheral edge 23. The edges adjacent the slit 13 may be referred to as first edge 25 and second edge 26. It is foreseen that the wheel rim guard 1 may be shipped unassembled wherein the body 11 is rolled into a cylinder to fit into appropriate packaging. When the wheel rim guard 1 is unpackaged, the body 11 is unrolled to be assembled as explained below.

Figure 1:
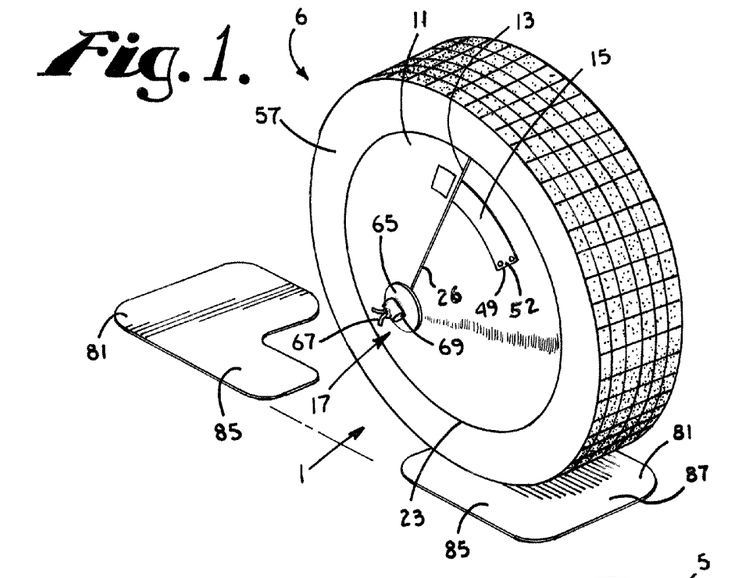
FIG. 1 is a perspective view of the frusto-conical wheel rim guard attached to a wheel rim.
Figure 2:
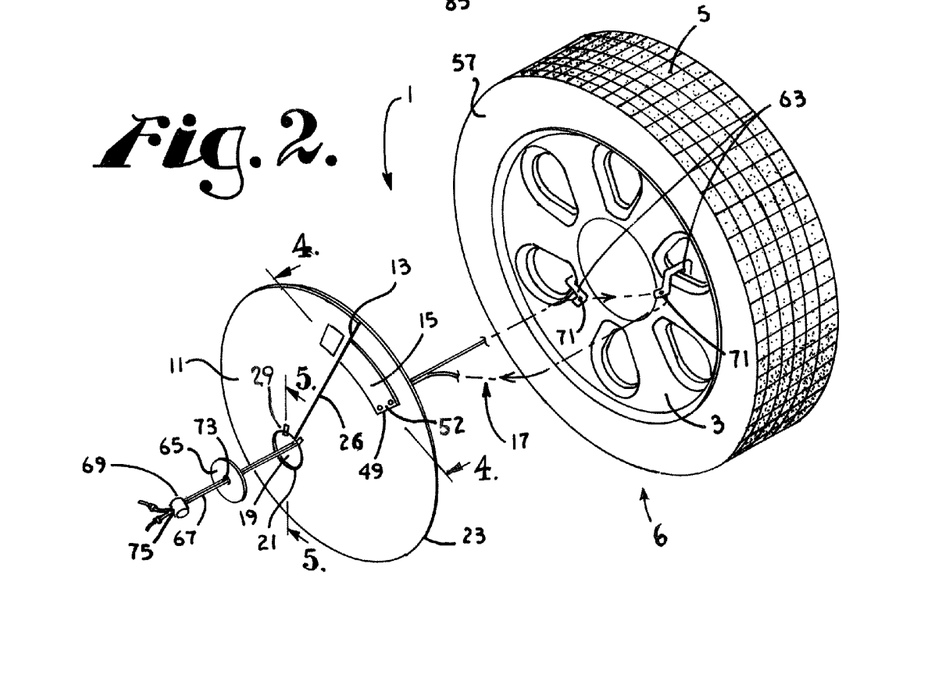
FIG. 2 is a partially exploded view of the frusto-conical wheel rim guard attached to a wheel rim.
Figure 3:
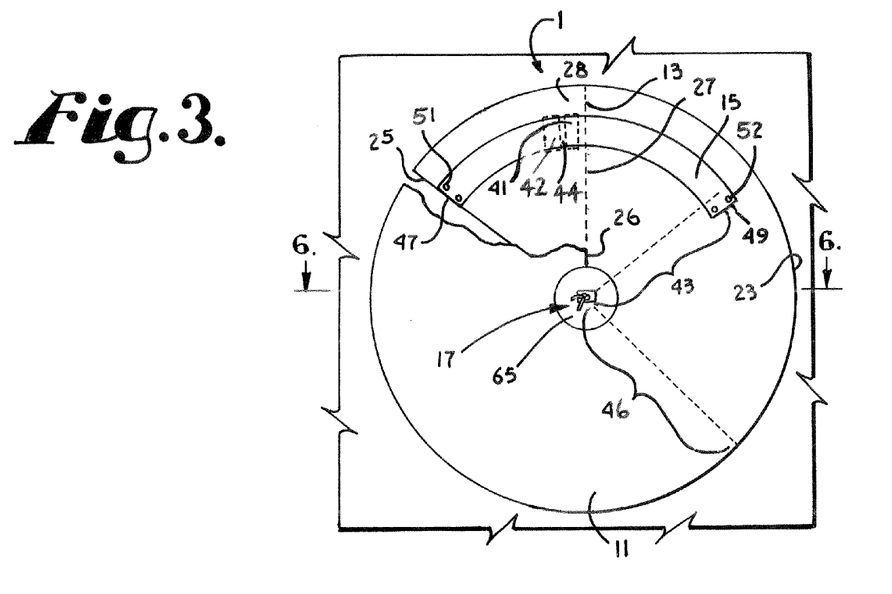
FIG. 3 is a front view of the frusto-conical wheel rim guard.
Figure 5:
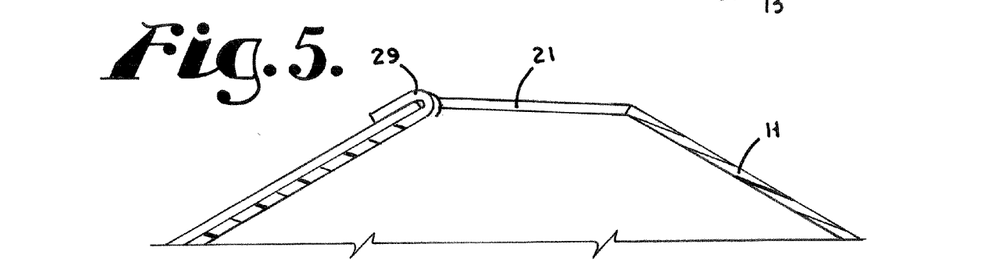
FIG. 5 is a side view of a cross-section through the conical body of the wheel rim guard.
Figure 7:
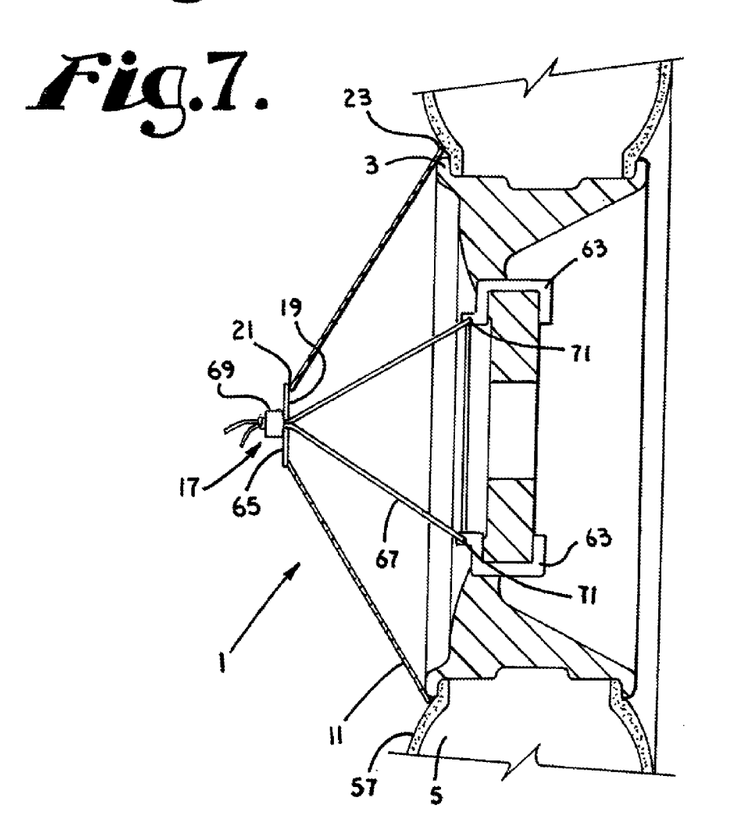
FIG. 7 is a side view of a cross-section through the frusto-conical wheel rim guard attached to a wheel rim.

The radial slit or gap 13 and middle opening 19 allow the body 11 to be formed into a frusto-conical shape by overlapping the second edge 26 over the first edge 25 of the body 11, as shown in FIGS. 1, 2, and 7. The portion of the body that may be advanced into overlapping relationship with the rest of the underlying portion of the body may be referred to as the overlapping portion 27 and the portion which may be overlapped may be referred to as the underlying portion 28. A tab 29 protrudes from the inner edge 21 of the body 11 adjacent the second edge 2. The tab 29 is hook shaped with a shank extending away from or past the inner edge 21 and a hook portion extending back over the inner edge 21 and over and downward along the body 11. As the body 11 is formed into the frusto-conical shape, the tab 29 slidingly receives the inner edge 21 of middle opening 19 proximate the second edge 26 of the body 11 as shown in FIG. 5.

Figure 4:
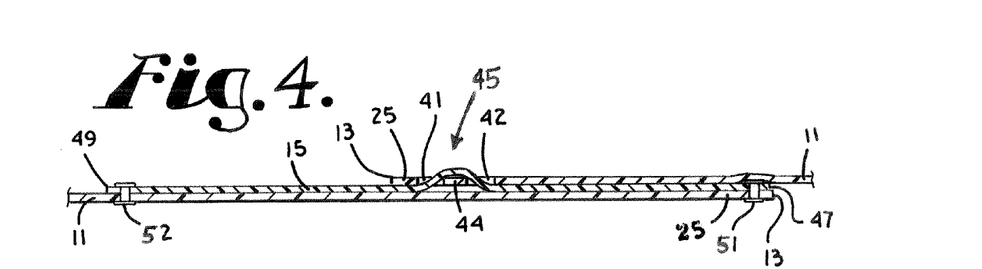
FIG. 4 is a cross-sectional view of the wheel rim guard along the rigid adjustment guide.

Guide receiving slots 41 and 42, for receiving the arcuate guide 15, are cut into and through the body 11 with a center bar or loop 44 extending between the slots 41 and 42. The slots 41 and 42 are formed in the body 11 near the second edge 26 in alignment with the guide strap 15. The guide receiving slots 41 and 42 and the center bar or loop 44 generally form a buckle 45 with the surrounding portions of the body 11 as shown in FIG. 4. The buckle 45 may also be referred to as a receiver or a frictional receiver. It is foreseen that the buckle or receiver 45 could be formed separate from the sheet material forming the body 11 and attached to the underside of the overlapping portion of the body 11 generally proximate the second edge 26 as shown in cross-section in FIG. 6.

The arcuate guide 15 preferably comprises a flat strap formed in the shape of an arc with a radius 43 that is smaller than the radius 46 of the peripheral edge 23 of the body 11. In the embodiment shown, the arcuate guide 15 is secured on top of the body 11 with a first end 47 of the arcuate guide 15 secured to the body 11 near the first edge 25 and a second end 49 of the arcuate guide 15 extending back around the body 11 toward the second edge 26. The portion of the body 11 adjacent the second edge 26 generally extends over the arcuate guide 15 mounted on top of the portion of the body 11 extending past the first edge 25. The ends 47 and 49 of arcuate guide 15 may be secured in place by snaps, rivets or other suitable fastening means. For example, a first set of rivets 51 is shown connecting end 47 of guide 15 to the body 11 and a second set of rivets 52 is shown connecting end 49 of guide 15 to the body 11. One or both sets of fasteners 51 or 52 may be a snap type fastener to allow the arcuate guide 15 to be easily removed. For example, using snap fasteners as the second set of fasteners 52 would allow the second end 49 of guide 15 to be disconnected from the body to allow the flattened body 11 to be rolled into a cylinder to facilitate shipping. Prior to use, the arcuate guide 15 is easily snapped or secured in place on the frusto-conical body in the position as explained above and shown in FIGS. 1 and 2.

The arcuate guide 15 is secured on the body 11 at a position at which the radius of the arcuate guide 15 corresponds to the radius of the portion of the body 11 over which or against which it is secured. In the embodiment shown, the arcuate guide 15 is positioned closer to the outer peripheral edge 23 of the body and preferably within one to two inches of the peripheral edge 23. Before the first end 47 of arcuate guide 15 is secured to the body 11, it is threaded through the guide receiving slots 41 and 42 as shown in FIG. 4 and over the center bar or loop 44. More specifically, the arcuate guide 15 extends beneath the body 11 adjacent the second edge 26 then up through slot 41, over center bar 44 and back down through slot 42 so that the first end 47 of the arcuate guide 15 extends below the overlapping portion of the body 11 extending beyond the second edge 26. The center bar 44 may deform downward or away from the outer surface of the body 11. It is to be understood that the bend in the arcuate guide 15 threaded through slots 41 and 42 and over center bar 44 is exaggerated in FIG. 4. The actual bend in the guide 15 is relatively slight. Once the first end 47 of arcuate guide 15 is secured to the body 11, the arcuate guide 15 generally holds the overlapping portion 27 of the body 11 in overlapping and closely spaced relation with the underlying portion 28 while allowing the overlapping and underlying portions 27 and 28 to slide relative to one another in overlapping relationship. The arcuate guide 15 sliding through buckle 45 allows adjustment of the overlapping relationship between the overlapping and underlying portions 27 and 28.

The arcuate guide or guide strap 15 is preferably formed from the same sheet material as the body 11 is sufficiently thin to permit bending bends generally transverse to its arcuate length but is sufficiently narrow so that it does not bend across its width. In addition, the material is sufficiently rigid or incompressible about any of the planar axes of the flattened sheet material that it is generally inflexible about its radius of curvature, or in other words it maintains a constant curvature. In addition, the guide strap 15 is rigid along the path of travel of the overlapping portion of the body 11 sliding across the guide strap 15 such that the guide strap 15 will not fold or buckle and shorten in length as a user draws the overlapping portion of the body 11 in greater overlapping relation with the underlying portion of the body 11.

The outer surface of the guide strap 15 or the inner surface of the body 11 or both may be textured to increase the friction between the arcuate guide 15 and buckle 45 to help hold the overlapping and underlying portions 27 and 28 in a selected overlapping relationship when adjusting the circumference of the wheel rim guard peripheral edge 23 as described below. Adjustment of the circumference of the peripheral edge 23 may also be described as adjusting the base diameter of the frusto-conical shaped wheel rim guard 1. When arcuate guide 15 is threaded through the guide receiving slots 41 and 42 and attached to the body 11, the first and second edges 25 and 26 are drawn across one another causing the body 11 to form a frusto-conical shape. A user may adjust the circumference or base diameter of the frusto-conical body 11 by adjusting the overlapping relationship of the first and second edges 25, 26. When the wheel rim guard 1 is adjusted to various diameters, the tab 29 holds the inner edge 21 of the overlapping portion 27 to the inner edge 21 of the underlying portion 28. The rigidly maintained arcuate shape of the arcuate guide 15 threaded through the buckle 45 also functions to keep the peripheral edge 23 of the overlapping portion 27 generally circumferentially aligned with the peripheral edge 23 of the underlying portion 28 as the overlapping alignment is adjusted.

The overlapping relationship of the two edges 25, 26 of the body 11 is limited by the length of the arcuate guide 15. For example, to achieve a greater circumference or base diameter of the frusto-conical body 11, the two edges 25, 26 are pulled toward each other with the guide strap 15 sliding through the slots 41 and 42 and over or across cross bar 44. The maximum base diameter of the frusto-conical body 11 is achieved when the center bar 44 abuts against the attachment point of the first end 47 of the arcuate guide 15 to the body 11. To achieve a smaller base diameter of the frusto-conical body 11, the two edges 25, 26 are pushed away from each other to draw the overlapping portion 27 in greater overlapping relation to the underlying portion 28 with the arcuate guide 15 sliding through the slots 41 and 42 and over or across cross bar 44. The minimum circumference or base diameter of the frusto-conical body 11 is achieved when the cross bar 44 abuts against the second end 49 of the arcuate guide 15 at its attachment point to the body 11. As is apparent, a user may slide the edges 25, 26 toward or away from one another as needed to achieve any desired base diameter between the described minimum and maximum base diameters. If a different range of base diameters is desired, the arcuate guide 15 may be replaced with an arcuate guide of greater or lesser lengths with the location of attachment of the second end of the arcuate guide changing accordingly. The arcuate guide 15 will experience broad bends relative to its radial axes resulting from the adjustments of the diameter of the body 11.

The resiliency of the sheet material forming the body tends to urge the first and second edges 25, 26 of the body 11 toward one another and towards the initially flat disc shape of the body 11, as limited by the length of the arcuate guide 15 to the maximum base diameter allowed. Manually drawing the edges 25, 26 of the body into greater overlapping relationship and into a frusto-conical shape with an increasingly smaller base diameter creates bending stresses urging the ends 25, 26 outwardly, back toward the maximum circumference or diameter.

Figure 6:
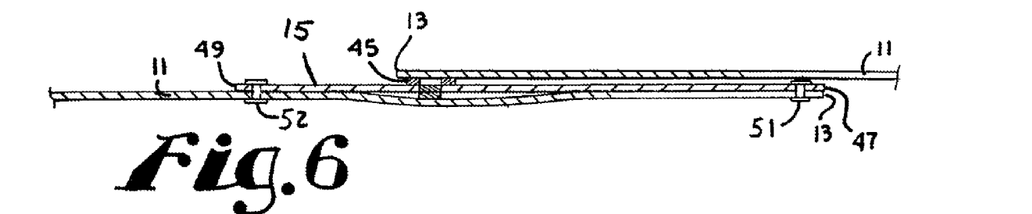
FIG. 6 is a side view of a cross-section through the wheel rim guard along the rigid adjustment guide showing the buckle separate from the body.

A user may use the wheel rim guard 1 to cover a wheel rim 3 without the hook assembly 17. First, the user adjusts the circumference 23 or base diameter of the body 11 of the wheel rim guard 1 to just fit over the wheel rim 3. While holding the wheel rim guard 1 in the selected size, the peripheral edge 23 of the wheel rim guard 1 is pressed against the tire 5 adjacent the wheel rim 3. As seen in FIG. 6, a sidewall 57 of the tire 5 against which the peripheral edge 23 is positioned, bulges outward from the wheel rim 3. Pressing the wheel rim guard 1 against the tire sidewall 57 allows the forces acting on the sheet material of the guard 1 to overcome the frictional forces created between the arcuate guide 15 and the center bar 44 allowing the base diameter of the wheel rim guard 1 to self adjust to fit over the wheel rim 3. Once the base diameter of the wheel rim guard 1 self adjusts to fit over the wheel rim 3, pressing the peripheral edge 23 of guard 1 against the tire 5 provides enough resistance to further expansion of the overlapping portions of the guard 1 causing the guard to hold its shape or base diameter. While holding the wheel rim guard 1 against the wheel 6 with one hand, the user can then apply tire treatment products with the other hand.

The hook assembly 17 is provided to allow the user to mechanically hold the wheel rim guard 3 against the wheel 6 in the selected size, freeing up both hands to apply tire treatment products. a hook assembly 17. The hook assembly 17 comprises two hooks 63 and a washer 65, a drawstring 67 and a cord lock or clamp 69. The wheel hooks 63 are generally u-shaped and have a cord receiving hole 71 formed in a laterally extending tab 72. The washer 65 may be formed from the same sheet material used to form the body 11 and includes a cord receiving hole 73 in the center thereof. The diameter of the washer 65 is greater than the diameter of the circular, middle opening 19 of the body 11. It is foreseen that the washer 65 may be of any shape but have an end-to-end dimension greater than the diameter of the circular middle opening 19 of the body 11. The cord lock or clamp 69 is preferably a spring loaded type clamp with a central cord receiving hole 75 formed between two clamping members which normally clamp onto the drawstring 67 to fix the position of the cord lock 69 on the drawstring 67. Pressing the two clamping members together increases the diameter of the drawstring receiving hole allowing the cord lock 69 to slide relative to the drawstring 67.

As shown in FIGS. 2 and 6, the drawstring 67 is threaded through the cord receiving hole 71 of each hook and each end of the cord 67 is threaded through the cord receiving hole 73 of the washer 65. The ends of the cord 67 are further threaded through the cord receiving hole 75 of the cord lock 69.

In use, the hooks 63 are first placed through the circular, middle opening 19 and inside the frusto-conical body 11. The washer 65 remains outside the frusto-conical body 11, as shown in FIG. 2 with the cord lock 69 positioned near the ends of the drawstring 67 to provide sufficient slack in the drawstring 67 to position the hooks on the wheel rim 3. The hooks 63 are then hooked to openings in the wheel rim 3. The user then manually adjusts the size of the wheel rim guard 1 and presses its peripheral edge 23 against the tire sidewall 57 and over the rim 3. The cord 67 is then pulled taut and the cord lock 69 is pulled tight against the washer 65 which abuts against the inner edge 21 of the circular middle opening 19 to securely fasten the wheel rim guard 1 over the wheel rim 3.

Optional floor mats 81 are used to protect the ground surface from tire cleaner and dressing overspray and dripping. The floor mats 81 are L-shaped and placed beneath the tire 5. The front portions 85 of the floor mats 81 slide in front of the tire 5 and the side portions 87 of the floor mats 81 slide to the front and rear of the tire 5, as shown in FIG. 1. When the front and rear floor mats 81 are under the tire, the front portions 85 of the floor mats 81 overlap to cover the entire front and sides of the surface surrounding the tire 5.

Figure 8:
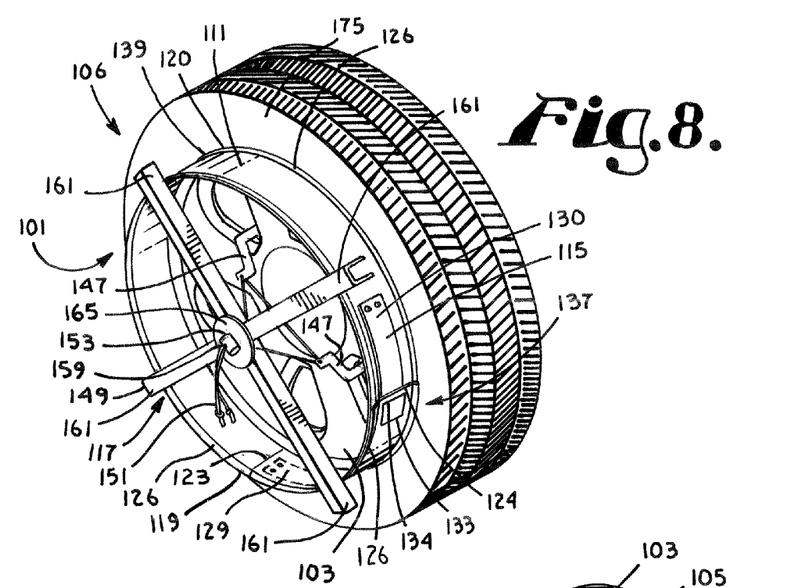
FIG. 8 is a perspective view of the cylindrical wheel rim guard with fixed cross-bar arms attached to a wheel rim.
Figure 9:
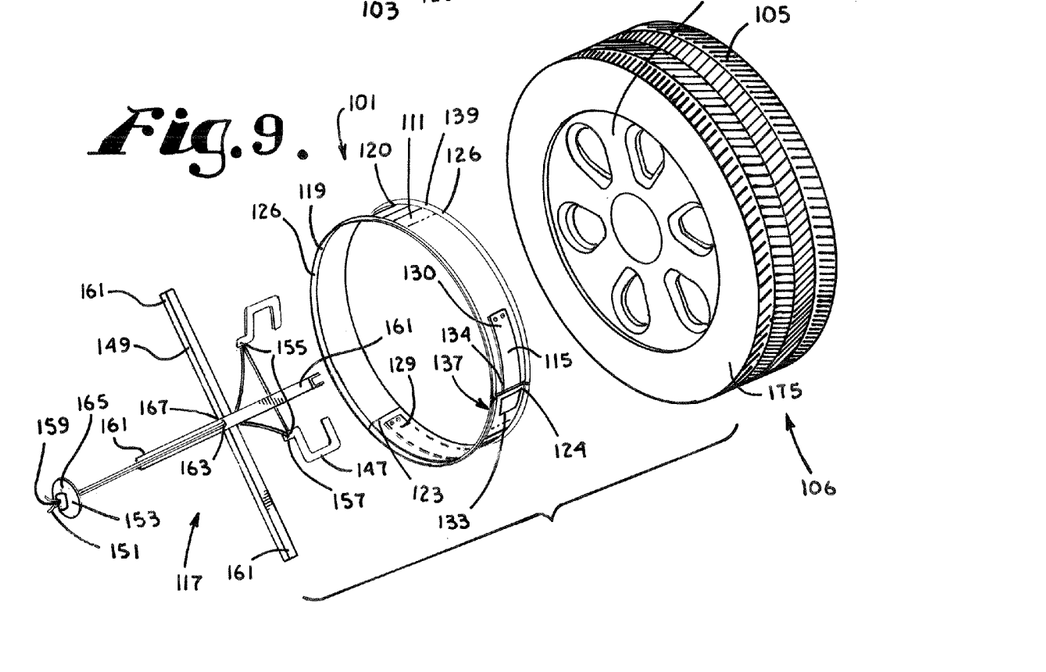
FIG. 9 is a partially exploded view of the cylindrical wheel rim guard with fixed cross-bar arms attached to a wheel rim.

The present invention may also be adapted to serve as a tire guard to provide a barrier between the tire 105 and wheel rim 103 for detailing the wheel rim 103. The reference number 101 generally designates a tire guard according to a second embodiment of the present invention. Referring now to FIGS. 7-9, the tire guard 101 of the present embodiment fits around the wheel rim 103 and abuts against the tire 105 to shield the wheel rim 103 from tire cleaning agents or dressings and the tire 105 from wheel cleaning agents, respectively. The tire guard 101 allows a user easy access to the entire wheel rim 103 surface area while providing a barrier between the wheel rim 103 and tire 105. As noted previously, the wheel rim 103 and tire 105 may be referred collectively as the wheel 106.

The tire guard 101 of a second embodiment generally comprises, as assembled, a cylindrical body 111, a guide strap 115 and a hook assembly 117. Similar to the materials of construction of the first embodiment, the body 111 is made from a sheet material that bends or flexes about any of the planar axes of the flattened sheet but is generally rigid or incompressible along the planar axes. The sheet material is also preferably resistant to corrosion and degradation potentially resulting from exposure to tire cleaners and dressings. A preferred material of construction is ABS plastic, but it is understood that other materials including paper board or other sheet material providing similar properties could be utilized. The guide strap 115 is preferably made from the same or a similar sheet material that bends about any of the planar axes of the flattened sheet material but is generally rigid or incompressible along the planar axes.

Unassembled, the body 111 of the tire guard 101 is generally a long rectangular section having a first outer edge 119, a second outer edge 120, a first end 123 and a second end 124. The first outer edge 119 and second outer edge 120 are angled outwardly along the length of the body 111 to create an angled portion 126 at each edge 119, 120. When assembled into the cylindrical shape, as shown in the referenced Figures, the angled portions 126 at each edge 119, 120 angle outwardly from the center of the cylindrical body 111.

Guide receiving slots 133 and 134, for receiving the guide strap 115, are cut into and through the body 111 with a center bar or loop 135 extending between the slots 133 and 134. The slots 133 and 134 are formed in the body 111 near the second end 124 in alignment with the guide strap 115. The guide receiving slots 133 and 134 and the center bar or loop 135 generally form a buckle 137 with the surrounding portions of the body 111.

The guide strap 115 preferably comprises a strap having a first end 129 and a second end 130. In the present embodiment, the guide strap 115 is secured to the body 111 with a first end 129 of the guide strap 115 secured to the body 111 near its first end 123 and a second end 130 of the guide strap 115 extending toward the body second end 124. The ends 129 and 130 of guide strap 115 may be secured in place by rivets or other suitable fastening means. The guide strap 115 is secured substantially centered across the width of the body 111.

The body 111 and guide strap 115 are assembled similar to the wheel rim guard 1 of the first embodiment. Before the first end 129 of guide strap 115 is secured to the body 111, it is threaded through the guide receiving slots 133 and 134 and over the center bar or loop 135 of the buckle 137. The guide strap 115 is threaded through the buckle 137 similar to the buckle 45 as shown in FIG. 4. Once the first end 129 and second end 130 of the guide strap 115 is secured to the body 111, the guide strap 115 generally holds the second end portion of the body 111 in overlapping and closely spaced relation with the first end portion while allowing the first and second ends 123, 124 of the body 111 to slide relative to one another in overlapping relationship. The guide strap 115 sliding through the buckle 137 allows adjustment of the overlapping relationship between the first and second end portions of the body 111. The outer surface of the guide strap 115 and the inner surface of the body 111 are preferably textured to increase the friction between the guide strap 115 and center bar 136 to help hold the edge portions in a selected overlapping relationship when adjusting the tire guard circumference 139 as described below.

The diameter of the cylindrical body 111 is adjusted according to the diameter of the wheel rim 103 by adjusting the overlapping relationship of the ends 123, 124 of the body 111. The overlapping relationship of the two ends 123, 124 of the body 111 is limited by the length of the guide strap 115. For example, to achieve a greater circumference 139 (and greater corresponding radius 140) of the body 111, the two ends 123, 124 are pulled toward each other with the guide strap 115 sliding through the slots 133, 134 and over or across the loop 136. The maximum circumference 139 of the body 111 is achieved when the loop or center bar 136 abuts against the attachment point of the first end 129 of the guide strap 115 to the body 111. To achieve a smaller circumference 139 (and smaller corresponding radius 140) of the body 111, the two ends 123, 124 are pushed away from each other to draw the second end portion 124 in greater overlapping relation to the first end portion 123 with the guide strap 115 sliding through the slots 133, 134 and over or across loop 135. The minimum circumference 139 of the body 111 is achieved when the loop 135 abuts against the second end 130 of the guide strap 115 at its attachment point to the body 111. As is apparent, a user may slide the ends 123 and 124 toward or away from one another as needed to achieve any desired circumference 139 between the described minimum and maximum circumferences. If a different range of circumferences is desired, the guide strap 115 may be replaced with a guide strap of greater or lesser lengths with the location of attachment of the second end of the guide strap changing accordingly. The guide strap 115 will experience broad bends along its longitudinal axis resulting from the adjustments of the diameter of the body 111.

The hook assembly 117 is provided to allow the user to mechanically hold the tire guard 101 against the wheel 106 in the selected size, freeing up both hands to apply tire or wheel cleaning products. The hook assembly 117 comprises two hooks 147, a cross-bar 149, a cord or drawstring 151, a cord lock or clamp 153 and a washer 165. The wheel hooks 147 are generally u-shaped and have a cord receiving hole 155 formed through a laterally extending tab 157.

The cross-bar 149 comprises four arms 161 extending outwardly from a center intersection 163. The washer 165 may be affixed to the center intersection 163. The arms 161 extend at ninety-degree angles from each other along a single plane. A cord receiving hole 167 is formed through the center intersection 163 and washer 165. The cross-bar 149 and washer 165 are preferably constructed from a lightweight aluminum or aluminum alloy. The arms 161 of the present embodiment are channel pieces with the channel opening facing away from the washer 165. It is foreseen that the arms 161 may have any cross-sectional shape such as a square, circle, or the like. It is further foreseen that the cross-bar 149 may have any number of arms extending outwardly at various angles in a single plane. Each arm 161 of the cross-bar 149 must be greater in length than the maximum radius of the 140 of the cylindrical body 111.

The cord lock or clamp 153 is preferably a spring loaded type clamp with a central cord receiving hole 159 formed between two clamping members which normally clamp onto the drawstring 151 to fix the position of the cord lock 153 on the drawstring 151. Pressing the two clamping members together increases the diameter of the drawstring receiving hole allowing the cord lock 153 to slide relative to the drawstring 151.

As shown in FIGS. 7, 8, and 9, the drawstring 151 is threaded through the cord receiving hole 155 of each hook 147 and each end of the drawstring 151 is threaded through the cord receiving hole 167 of the fixed washer 165 and center intersection 163. The ends of the drawstring 151 are further threaded through the cord receiving hole 159 of the cord lock 153. As assembled, the hooks 147 of the fastening assembly 145 are on the side of the cross-bar 149 opposite the center washer 165.

To secure the tire guard 101 to the wheel 106, the diameter of the cylindrical body 111 is adjusted according to the diameter of the wheel rim 103, as described above. The cylindrical body 111 is placed on the wheel rim 103 such that the angled portion 126 of the edge 120 engages the tire sidewall 175, as shown in FIG. 9. The hooks 147 of the fastening assembly 117 are then hooked to openings in the wheel rim 103. The cord 151 is then pulled taut and the cord lock 153 is pulled tight against the fixed washer 165 to push the cross-bar against the outer edge 119 of the body 111 to securely fasten the tire guard 101 to the wheel 106.

Alternatively, a pivoting cross-bar assembly 181 may be integrated into the body 111 as shown in FIGS. 10-13. The pivoting cross-bar assembly 181 comprises three arms 182, 183, and 184 pivotally connected to a central pivot hub 185 and received through the body 111.

The pivot hub 185 of the pivoting cross-bar assembly 181 comprises upper and lower triangular sections 189 and 190. Pivot pin receiving holes 193 are formed through the upper and lower triangular sections 189 and 190 proximate each corner 195. A cord receiving hole 197 is formed through the center of each triangular section 189 and 190.

The pivoting cross-bar arms 182, 183 and 184 each have a first end 201 and a second end 203 and a length greater than the maximum radius of the body 111. A pivot pin receiving hole 205 is formed in the first end 201 of each pivoting cross-bar arm 182, 183 and 184. The pivoting cross-bar arms 182, 183 and 184 may be cylindrical or another appropriate geometry. It is foreseen that any plurality of pivoting cross-bar arms may be utilized with the described embodiment of the present invention.

The pivot hub 185 is assembled by aligning the pivot pin receiving holes 193 of the upper and lower triangular sections 189 and 190 with the pivot pin receiving hole 205 of each pivoting cross-bar arm 182, 183 and 184. A pivot pin 207 received therethrough to form the pivot hub 185 such that the three cross-bar arms 182, 183 and 184 pivotally extend from each corner of the pivot hub 185. The pivot pins 207 preferably have threaded end caps to secure the pivot hub 185 as assembled.

Figure 10:
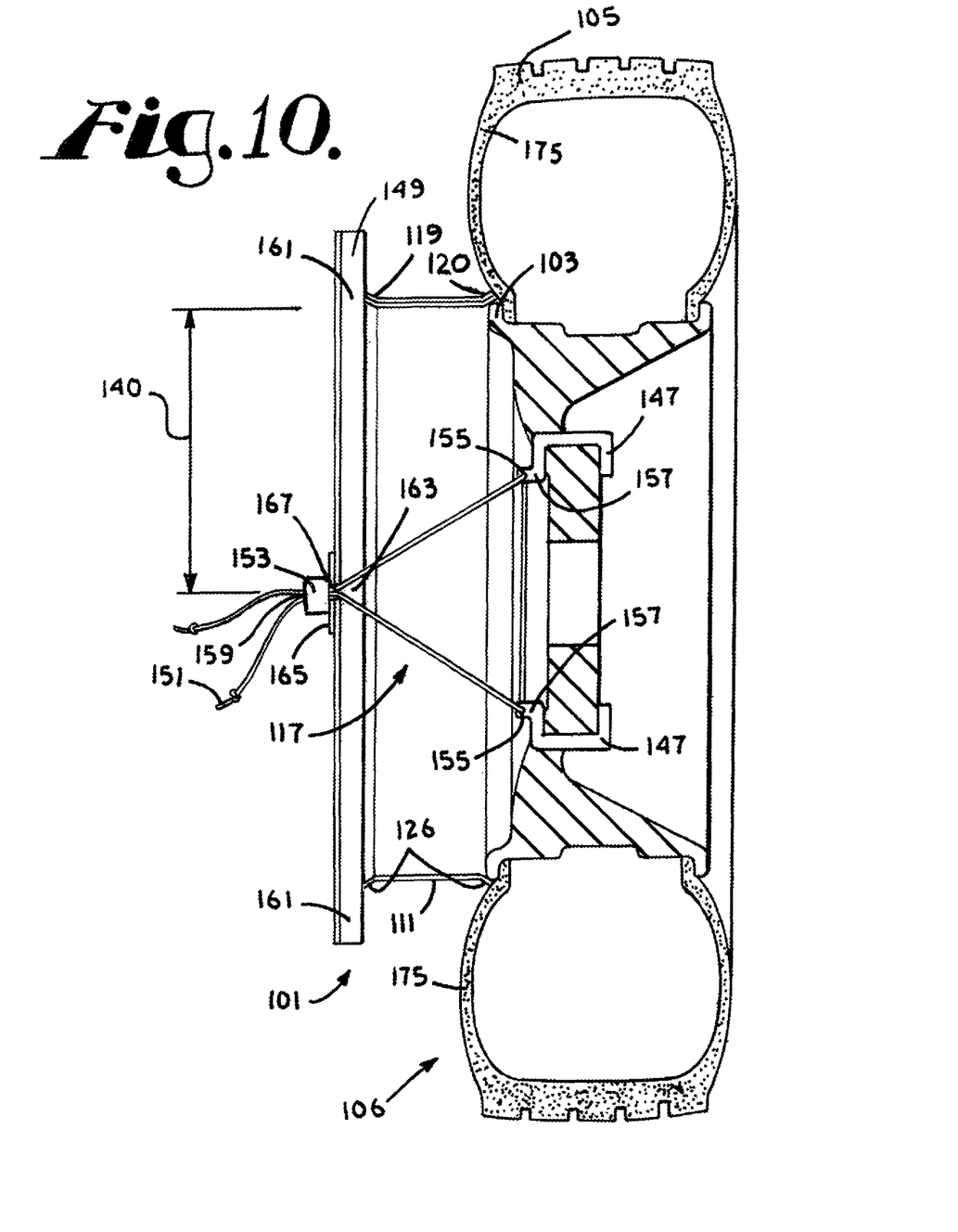
FIG. 10 is a cross-sectional view of the cylindrical wheel rim guard attached to a wheel rim.
Figure 11:
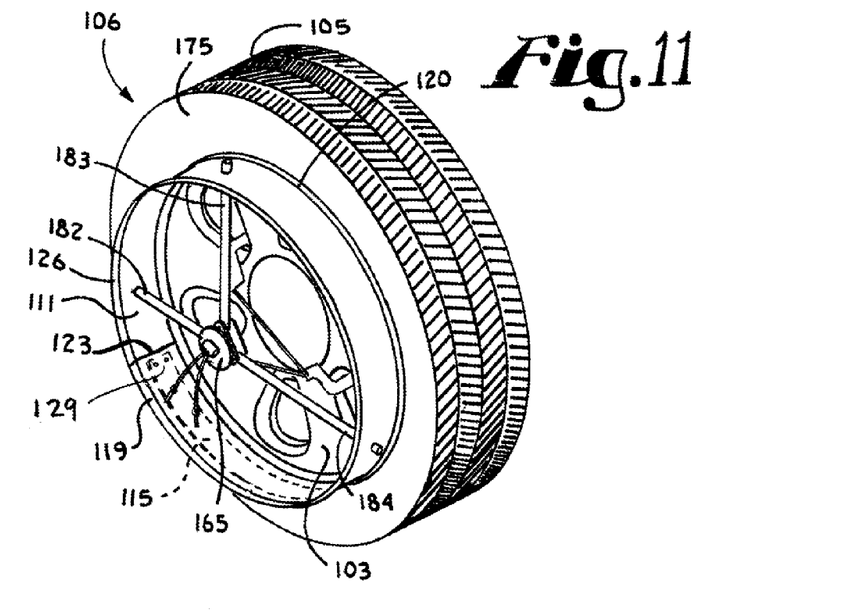
FIG. 11 is a perspective view of the cylindrical wheel rim guard with pivoting cross-bar arms attached to a wheel rim.
Figure 12:
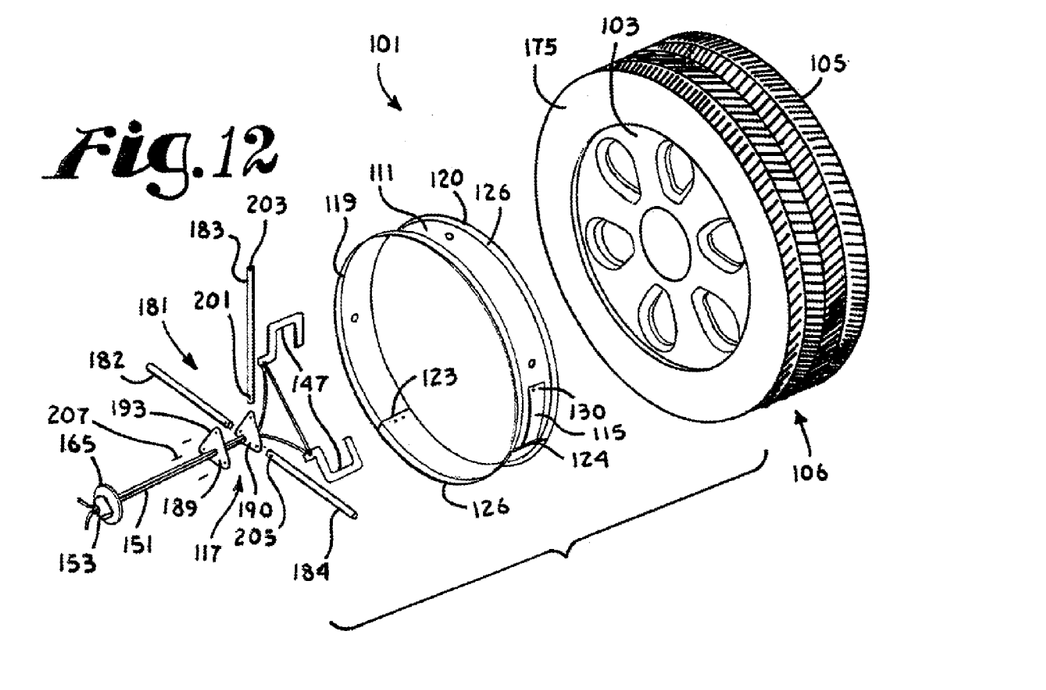
FIG. 12 is a partially exploded view of the cylindrical wheel rim guard with pivoting cross-bar arms attached to a wheel rim.
Figure 13:
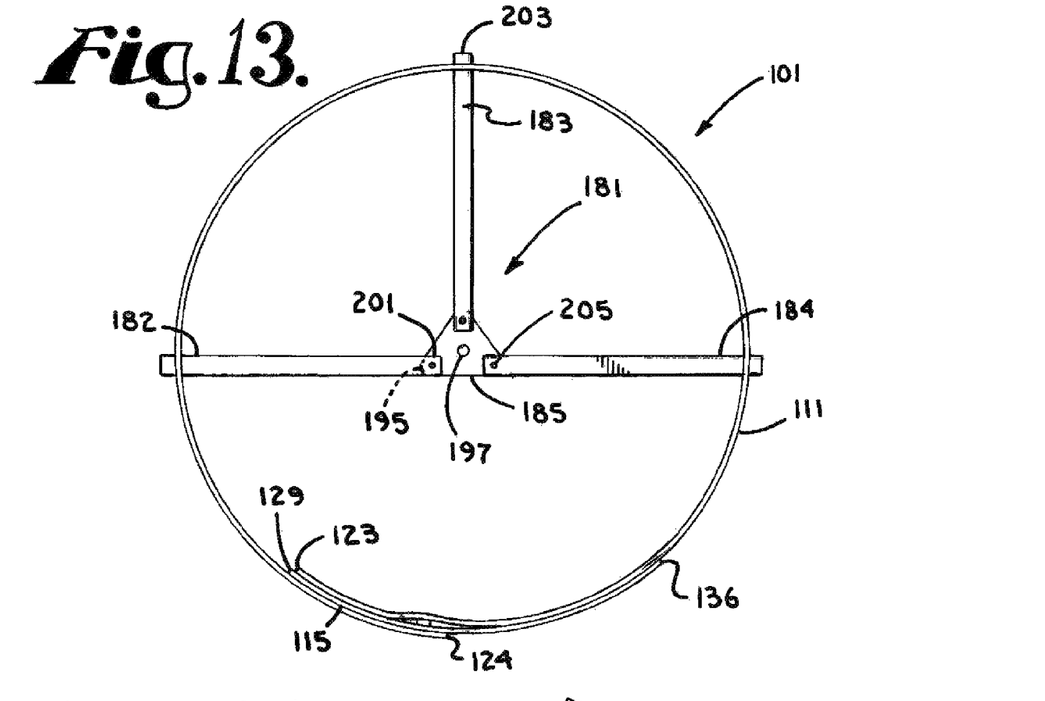
FIG. 13 is a side view of the cylindrical wheel rim guard with pivoting cross-bar arms in an intermediate body diameter position.
Figure 14:
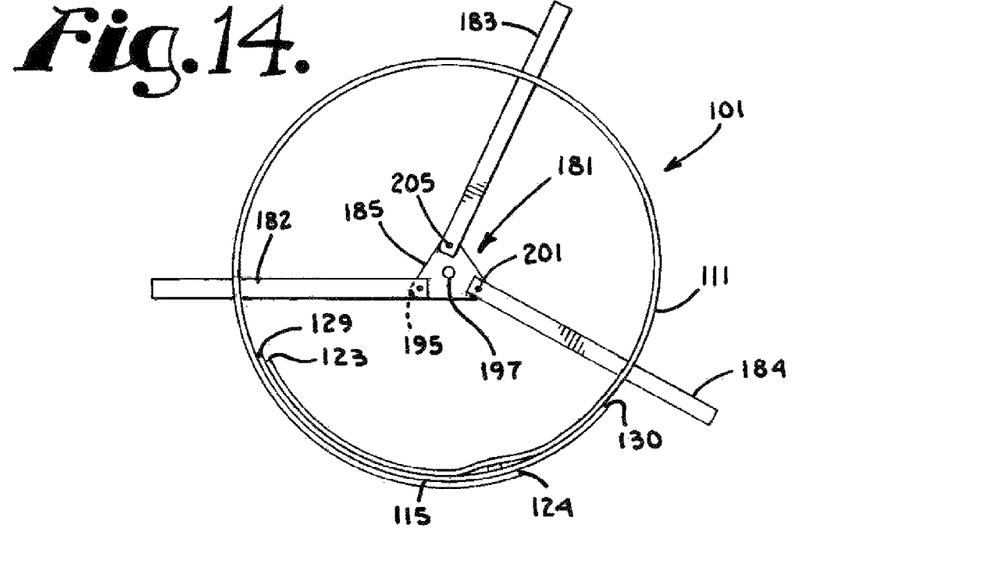
FIG. 14 is a side view of the cylindrical wheel rim guard with pivoting cross-bar arms in a minimum body diameter position.

The second ends 203 of each cross-bar arm 182, 183 and 184 are slidably received through the body 111 as shown in FIGS. 10, 12 and 13. The drawstring 151 is threaded through the cord receiving hole 155 of each hook 147 and each end of the drawstring 151 is threaded through the cord receiving hole 167 of the washer 165 and cord receiving holes 197 of the upper and lower triangular sections 189 and 190. The ends of the drawstring 151 are further threaded through the cord receiving hole 159 of the cord lock 153. As assembled, the hooks 147 of the fastening assembly 145 are on the side of the pivot hub 185 opposite the center washer 165. The wheel guard 101 incorporating the pivoting cross-bar assembly 181 may be attached to a wheel 106 as described above.

As described previously, the body 111 may be adjusted according to the diameter of the wheel rim 103 by adjusting the overlapping relationship of the ends 123 and 124 of the body 111. As shown in FIGS. 12 and 13, as the diameter of the body 111 is adjusted, the angles of the pivoting cross-bar arms 182, 183 and 184 adjust accordingly. For example, FIG. 12 shows the body 111 at an intermediate diameter with the capability of adjusting to smaller or larger diameters. FIG. 13 shows the body 111 adjusted to the minimum diameter wherein the angles of the pivoting cross-bar arms 182, 183 and 184 adjust according to the smaller diameter of the body 111. As the diameter of the body 111 becomes smaller, the second ends 203 of the cross-bar arms 182, 183 and 184 extend further from the body 111.

It is foreseen that the pivoting cross-bar assembly 181 may be removed from the body 111 for storage and shipping.

It is to be understood that while certain forms of the present invention have been illustrated and described herein, it is not to be limited to the specific forms, process steps or arrangement of parts described and shown and that the invention should be limited only by the claims.

I claim:

1. A wheel rim guard for a wheel rim comprising:
    a resilient circular disc having a gap extending from a central inner opening to a peripheral edge of said disc; said gap forming a first edge and a second edge of said disc;
        wherein said first and second edges of said disc are positioned in overlapping relationship;
    an arcuate guide having a first end and a second end; said arcuate guide extending through a receiver on said disc proximate said second edge; wherein said first end of said arcuate guide is fastened proximate said first edge of said disc, and said second end of said arcuate guide is fastened to said disc in spaced relation from said first edge of said disc, with the receiver slidably advanceable relative to said arcuate guide between the first and second ends thereof to permit adjustment of the overlapping relationship of the second edge relative to the first edge;
    wherein the diameter of said peripheral edge of said disc is adjustable by adjusting the overlapping relationship of said first and second edges.

2. The wheel rim guard for a wheel rim as in claim 1 wherein said disc forms a frusto-conical body with an exterior surface and an interior area.

3. The wheel rim guard for a wheel rim as in claim 2 wherein said central inner opening is a circular opening.

4. The wheel rim guard for a wheel rim as in claim 2 further comprising a hook assembly comprising at least one hook, a washer and a cord; wherein said cord is received through said at least one hook and said washer; wherein said central inner opening receives said at least one hook and a portion of said cord into said interior area.

5. The wheel rim guard for a wheel rim as in claim 4, said washer having a diameter greater than the diameter of said central inner opening; wherein said washer extends across said central inner opening opposite said interior area.

6. The wheel rim guard for a wheel rim as in claim 1, wherein said gap is a radial slit.

7. The wheel rim guard for a wheel rim as in claim 1, further comprising a tab attached to said central inner opening; said tab having a shank and a hook; wherein said hook slidingly receives an inner edge of said central inner opening proximate said second edge of said disc.

8. A wheel rim guard for a wheel comprising:
    a body having central inner opening and a peripheral edge; said peripheral edge having an upper edge and a lower edge;
    said body having a gap extending from said central inner opening to said peripheral edge forming a first edge and a second edge; wherein said second edge is held in overlapping relationship with said first edge of said body forming an interior area and an exterior area;
    a guide strap having a first end and a second end; said guide strap slidably extending through a receiver on said body proximate said second edge of said body; wherein said first end of said guide strap is fastened proximate said first edge of said body, and said second end of said guide strap is fastened to said body in spaced relation from said first edge of said body, with the receiver slidably advanceable relative to said guide strap between the first and second ends thereof to permit adjustment of the overlapping relationship of the second edge relative to the first edge;
    wherein the diameter of said peripheral edge of said disc is adjustable by adjusting the overlapping relationship of said first and second edges;
    wherein said guide strap is rigid along the path of travel of said body sliding along said guide strap.

9. The wheel rim guard for a wheel as in claim 8 further comprising a hook assembly comprising at least one hook, a washer and a cord; wherein said cord is received through said at least one hook and said washer; wherein said body receives said at least one hook and a portion of said cord into said interior area.

10. The wheel rim guard for a wheel as in claim 9 wherein said body forms a cylindrical body.

11. The wheel rim guard for a wheel as in claim 10, wherein said upper and lower edges are angled outwardly from said central inner opening.

12. The wheel rim guard for a wheel as in claim 10, said hook assembly further comprising a cross-bar; wherein said cord is received through said cross-bar.

13. The wheel rim guard for a wheel as in claim 12, said cross-bar having a plurality of arms.

14. The wheel rim guard for a wheel as in claim 13, wherein said central inner opening of said body is circular and the length of each arm is greater than the radius of said central inner opening of said body.

15. The wheel rim guard for a wheel as in claim 14, wherein said plurality of arms are pivotable.

16. The wheel rim guard for a wheel as in claim 15, wherein said plurality of arms received through said body.

17. The wheel rim guard for a wheel as in claim 8 wherein said body forms a frusto-conical body.

18. The wheel rim guard for a wheel as in claim 17 wherein said central inner opening is a circular opening.

19. The wheel rim guard for a wheel rim as in claim 17 further comprising a hook assembly comprising at least one hook, a washer and a cord; wherein said cord is received through said at least one hook and said washer; wherein said central inner opening receives said at least one hook and a portion of said cord into said interior area.

20. The wheel rim guard for a wheel rim as in claim 19, said washer having a diameter greater than the diameter of said central inner opening.

21. The wheel rim guard for a wheel rim as in claim 17, wherein said gap is a radial slit.

22. The wheel rim guard for a wheel rim as in claim 17, further comprising a tab attached to said central inner opening; said tab having a shank extending inwardly and a hook extending upwardly and outwardly along said disc; wherein said tab slidingly receives an inner edge of said central inner opening proximate said second edge of said disc.

23. A wheel rim guard for a wheel comprising:
a body having central inner opening and a peripheral edge; said peripheral edge having an upper edge and a lower edge;
said body having a gap extending from said central inner opening to said peripheral edge and forming a first edge and a second edge; wherein said second edge is held in overlapping relationship with said first edge of said body forming an interior area and an exterior area;
a tab attached to said body proximate said central inner opening; said tab having a shank and a hook; wherein said hook slidingly receives an inner edge of said body forming said central inner opening proximate said second edge of said disc;
a guide strap having a first end and a second end; said guide strap slidably extending through a portion of said body proximate said second edge of said body; wherein said first end of said guide strap is fastened proximate said first edge of said body, and said second end of said guide strap is fastened to said body in spaced relation from said first edge of said body with the second edge of said body slidably advanceable relative to said guide strap between the first and second ends thereof to permit adjustment of the overlapping relationship of the second edge relative to the first edge;
a hook assembly comprising at least one hook, a washer and a cord; wherein said cord is received through said at least one hook and said washer; wherein said body receives said at least one hook and a portion of said cord into said interior area
wherein the diameter of said peripheral edge of said disc is adjustable by adjusting the overlapping relationship of said first and second edges.

24. The wheel rim guard for a wheel as in claim 23 wherein said guide strap is rigid along the path of travel of said body sliding along said guide strap.

25. The wheel rim guard for a wheel rim as in claim 23 wherein said disc forms a frusto-conical body with an exterior surface and an interior area.

26. The wheel rim guard for a wheel rim as in claim 23 wherein said central inner opening is a circular opening.

27. The wheel rim guard for a wheel rim as in claim 23, said washer having a diameter greater than the diameter of said central inner opening.

28. The wheel rim guard for a wheel rim as in claim 23, wherein said gap is a radial slit.

* * * * *